UNITED STATES PATENT OFFICE

1,982,194

MANUFACTURE OF ANHYDROUS METAL CHLORIDES

Johannes Brode and Carl Wurster, Ludwigshafen-on-the-Rhine, Germany, assignors to I. G. Farbenindustrie Aktiengesellschaft, Frankfort-on-the-Main, Germany, a corporation of Germany No Drawing. Application June 5, 1926, Serial No. 114,030. In Germany June 16, 1925

3 Claims. (Cl. 23—94)

It is known that anhydrous metal chlorides, for example aluminium chloride can be obtained by treating a material containing the oxids of the metals such as alumina, with phosgene or with carbon monoxid and chlorine at about red heat. However, when carrying out this process on a technical scale, great difficulties were observed as the heat required was supplied in a very inconvenient manner; either the reaction vessel which then had to consist entirely of a material proof to chlorine, was heated externally or the gases were introduced into the vessel in a very hot state or the process was combined with a reaction supplying a great excess of heat such as the reaction of aluminium metal with chlorine.

We have now found that no supply of heat at all is necessary in practice provided the reaction vessel is well insulated against loss of heat. Once the reaction is started, cold gas can be continuously introduced into the reaction chamber, and also the metal oxid, or material containing the metal oxid, can be supplied and the solid residue removed continuously or at intervals.

Preferably the reaction is carried out in a shaft furnace, the inner parts of which consist of fire clay, quartz or other material sufficiently stable against carbon monoxide and chlorine at high temperatures, while the external shell of the furnace is made of a metal. Between the metallic casing and the inner parts is arranged a mass possessing small thermal conductivity, for example diatomaceous earth. While in the interior of the furnace sufficiently high temperatures are maintained by the reaction, the external metallic shell remains cool so that no difficulties are observed in rendering the furnace gas-tight. The upper part of the furnace is provided with a suitable pipe or the like for withdrawing the metal chloride vapors and the carbon dioxid formed by the reaction, and with an opening suitable for introducing the oxidic material. The lower part of the furnace is provided with openings for removing the residues and for introducing the reaction gases.

The process may be carried out with the carbon monoxid and chlorine combined to phosgene, but preferably with a mixture of equal volumes of carbon monoxid and chlorine, as in this case the development of heat is much greater. Even higher temperatures than are advantageous for the reaction may occur and in this case part of the carbon monoxid may be replaced by an admixture of coal or coke to the metal oxid material so that the carbon dioxid formed in the reaction reacts with the carbon and is thereby again converted to carbon monoxid.

The metal oxid material, for example pure or crude alumina, aluminium silicate such as china clay, rutile, chromite and the like, is preferably introduced into the furnace in the form of lumps after being desiccated by heating to incandescence. For starting the reaction, the mass is then heated, for example by burning therein producer gas until a temperature of at least 450° C. or preferably a little higher is reached. This temperature being once reached, heating is discontinued and the process can be carried out continuously without any further supply of heat with cold reaction gases blown in and introducing for example china clay in a cold state, removing silica at the bottom. We have found that when working with china clay and similar materials, the form of lumps is maintained even after nearly all alumina is removed therefrom. When working with silicates, the residue is generally a very pure silica which may be employed, either in the form of lumps or after pulverization, for various purposes, for example as heat insulating material.

Impurities contained in the crude materials, for example oxids of iron or titanium as are found in bauxite, react more rapidly with carbon monoxid and chlorine than alumina; therefore, it is advantageous to treat the material first in a shaft furnace so rapidly as to remove substantially only the impurities, and then to treat the purified material anew in another shaft furnace in which substantially pure aluminium chloride is obtained.

When aluminium chloride is to be prepared, the chloride vapors leaving the reaction vessel may also be purified by passing them prior to condensation, over metal turnings, for example over iron turnings or better aluminium turnings. Thereby ferric chloride is converted into difficultly volatilizable ferrous chloride which can be easily separated from aluminium chloride, or into metallic iron.

We claim:

1. The process of producing aluminium chloride which comprises acting with carbon monoxid and chlorine on material containing alumina at about red heat and protecting the reacting materials against loss of heat until the readily volatilizable impurities are removed, and then converting the purified alumina material into aluminium chloride by repeating the process, heat being supplied in the treatment only for starting the reaction.

2. The process of producing pure aluminum chloride from alumina which comprises initially removing the impurities from the alumina as vaporizable chlorides by reacting the alumina at red heat with a rapid stream of carbon monoxide and chlorine while protecting the reacting materials against loss of heat, until said vaporizable chlorides are removed, and then reacting the so treated alumina with further amounts of chlorine and carbon monoxid while protecting the reacting materials from loss of heat to convert the alumina into pure aluminum chloride, heat being supplied to the process only for starting the reaction.

3. The process of producing pure aluminum chloride from bauxite which comprises initially removing the titanium and iron therefrom as vaporizable chlorides by reacting the bauxite at red heat with a rapid stream of carbon monoxid and chlorine, while protecting the reaction against loss of heat, until said vaporizable chlorides are removed and then reacting the purified bauxite with further amounts of CO and $Cl_2$ while protecting the reacting materials against loss of heat to produce pure aluminum chloride, heat being supplied to the process only for starting the reaction.

JOHANNES BRODE.
CARL WURSTER.